(12) United States Patent
Kim et al.

(10) Patent No.: US 10,122,423 B2
(45) Date of Patent: Nov. 6, 2018

(54) METHOD FOR CONTROLLING ANTENNA AND ELECTRONIC DEVICE USING SAME

(71) Applicant: Samsung Electronics Co., Ltd., Suwon-si (KR)

(72) Inventors: Dooyoung Kim, Suwon-si (KR); Moonsik Min, Suwon-si (KR); Hyoungjoo Lee, Suwon-si (KR); Chaeman Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/581,645

(22) Filed: Apr. 28, 2017

(65) Prior Publication Data
US 2017/0366235 A1 Dec. 21, 2017

(30) Foreign Application Priority Data
Jun. 17, 2016 (KR) ........................ 10-2016-0075822

(51) Int. Cl.
*H04L 5/14* (2006.01)
*H04B 17/00* (2015.01)
(Continued)

(52) U.S. Cl.
CPC ............. *H04B 7/04* (2013.01); *H04B 7/0617* (2013.01); *H04B 7/0626* (2013.01);
(Continued)

(58) Field of Classification Search
USPC ........ 370/297, 307, 310, 276, 277; 375/211, 375/219, 220, 222, 240.26, 240.11,
(Continued)

(56) References Cited

U.S. PATENT DOCUMENTS 8,165,637 B2   4/2012  Park et al.
8,908,787 B2  12/2014  Piazza et al.
(Continued)

FOREIGN PATENT DOCUMENTS

JP     2011101112 A    5/2011
KR    20110048465 A    5/2011

OTHER PUBLICATIONS

Extended European Search Report, dated Oct. 24, 2017, regarding Application No. EP17171575.8, 8 pages.
(Continued)

*Primary Examiner* — Linda Wong

(57) ABSTRACT

Various exemplary embodiments of the present disclosure relate to a device and a method for controlling a plurality of antennas in an electronic device. The electronic device may include: a plurality of antennas; a communication circuit configured to be connected to the plurality of antennas; and at least one processor, wherein the processor may be configured to: set a multi-antenna service using a second number of antennas; activate the second number of antennas among the plurality of antennas when a time to transmit channel state information comes; transmit channel state information on the second number of antennas to a network device; and switch to activate a first number of antennas among the plurality of antennas and the second number of antennas may include a greater number of antennas than the first number of antennas. Other exemplary embodiments are possible.

20 Claims, 10 Drawing Sheets

(51) Int. Cl.
  *H04L 5/16* (2006.01)
  *H04L 27/00* (2006.01)
  *H04B 7/04* (2017.01)
  *H04W 52/02* (2009.01)
  *H04W 72/04* (2009.01)
  *H04B 7/06* (2006.01)
  *H04L 5/00* (2006.01)
  *H04L 27/28* (2006.01)
  *H04W 76/27* (2018.01)

(52) U.S. Cl.
  CPC ......... *H04B 7/0689* (2013.01); *H04B 7/0691* (2013.01); *H04L 5/00* (2013.01); *H04L 5/0023* (2013.01); *H04L 27/28* (2013.01); *H04W 52/0209* (2013.01); *H04W 72/042* (2013.01); *H04W 76/27* (2018.02); *Y02D 70/00* (2018.01)

(58) Field of Classification Search
  USPC .. 375/240.28, 259, 267, 295, 316, 324, 340, 375/346, 347, 349, 354, 356, 358
  See application file for complete search history.

(56) References Cited

U.S. PATENT DOCUMENTS

| | | | |
|---|---|---|---|
| 8,983,557 B1 | 3/2015 | Sun et al. | |
| 9,455,845 B2* | 9/2016 | Parker | H04L 27/261 |
| 9,882,614 B2* | 1/2018 | Murakami | H04B 7/0452 |
| 2008/0051037 A1* | 2/2008 | Molnar | H04B 7/0632 |
| | | | 455/70 |
| 2008/0165698 A1* | 7/2008 | Dalsgaard | H04W 24/10 |
| | | | 370/252 |
| 2009/0154530 A1* | 6/2009 | Fulghum | H04B 7/0413 |
| | | | 375/147 |
| 2011/0105049 A1 | 5/2011 | Yamada et al. | |
| 2011/0299480 A1* | 12/2011 | Breit | H04B 7/0626 |
| | | | 370/329 |
| 2012/0008510 A1* | 1/2012 | Cai | H04B 7/0404 |
| | | | 370/252 |
| 2012/0128088 A1 | 5/2012 | Ko et al. | |
| 2013/0089065 A1* | 4/2013 | Koorapaty | H04W 56/001 |
| | | | 370/330 |
| 2014/0036859 A1* | 2/2014 | Ekpenyong | H04W 72/042 |
| | | | 370/330 |
| 2014/0301297 A1 | 10/2014 | Geirhoffer et al. | |
| 2014/0314168 A1 | 10/2014 | Xu et al. | |
| 2015/0333812 A1* | 11/2015 | Breit | H04B 7/0626 |
| | | | 370/329 |
| 2015/0341103 A1 | 11/2015 | Piazza et al. | |
| 2015/0358931 A1* | 12/2015 | Koorapaty | H04W 56/001 |
| | | | 370/330 |
| 2016/0212643 A1* | 7/2016 | Park | H04B 7/0626 |
| 2017/0085294 A1* | 3/2017 | Levacov | H04B 3/14 |
| 2017/0264458 A1* | 9/2017 | Nickel | H04L 12/4015 |
| 2017/0347394 A1* | 11/2017 | Yasukawa | H04W 28/04 |
| 2018/0019859 A1* | 1/2018 | Cheng | H04L 5/1461 |
| 2018/0027508 A1* | 1/2018 | Tanaka | H04W 52/36 |

OTHER PUBLICATIONS

Pefkianakis et al., "CMES: Collaborative Energy Save for MIMO 802.11 Wireless Networks", 2013 21st IEEE International Conference on Network Protocols (ICNP), Oct. 2013, 10 pages.

Yu et al., "Power Management of MIMO Network Interfaces on Mobile Systems", IEEE Transactions on Very Large Scale Integration (VLSI) Systems, vol. 20, No. 7, Jul. 2012, pp. 1175-1186.

Communication from a foreign patent office in a counterpart foreign application, European Patent Office, "Communication pursuant to Article 94(3) EPC," Application No. EP 17171575.8, dated May 9, 2018, 6 pages.

* cited by examiner

METHOD FOR CONTROLLING ANTENNA AND ELECTRONIC DEVICE USING SAME

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Jun. 17, 2016, and assigned Serial No. 10-2016-0075822, the entire disclosure of which is hereby incorporated by reference.

TECHNICAL FIELD

Various exemplary embodiments of the present disclosure relate to a device and a method for controlling a plurality of antennas in an electronic device.

BACKGROUND

With the increasing use of electronic devices and improved utilization of wireless communication technology due to the development of information and communication technology and semiconductor technology, traffic via electronic devices has been increasing.

As traffic increases, electronic devices may employ a variety of technologies to increase wireless communication speed. For example, an electronic device may use a multi-antenna service (for example, Multiple Input Multiple Output (MIMO)) that uses a plurality of antennas to enhance data transmission speed and reliability in data transmission.

SUMMARY

To address the above-discussed deficiencies, it is a primary object to provide an electronic device including a plurality of antennas may determine a multi-antenna service for transmitting and receiving signals through an arrangement with a network device (for example, a base station). When the multi-antenna service is determined, the electronic device may continuously operate the plurality of antennas according to the multi-antenna service. For example, when the electronic device arranges the use of a 4×4 MIMO mode with the network device, the electronic device needs to maintain an activated state of four antennas arranged with the network.

Accordingly, when the multi-antenna service is used, the electronic device needs to continuously maintain the activated state of the plurality of antennas arranged with the network device, thus increasing power consumption.

Various exemplary embodiments of the present disclosure may provide a device and a method for reducing power consumption caused by the use of a multi-antenna service in an electronic device.

According to various exemplary embodiments of the present disclosure, an electronic device may include: a plurality of antennas; a communication circuit configured to be connected to the plurality of antennas; and at least one processor, wherein the processor may be configured to: set a multi-antenna service using a second number of antennas; activate the second number of antennas among the plurality of antennas if a transmission period of channel state information is elapsed; control the communication circuit to transmit channel state information on the second number of antennas to a network device; and activate a first number of antennas among the plurality of antennas in response to transmitting the channel state information, and the second number of antennas may include a greater number of antennas than the first number of antennas.

According to various exemplary embodiments of the present disclosure, an operating method of an electronic device may include: setting a multi-antenna service using a second number of antennas among a plurality of antennas functionally connected to the electronic device; activating the second number of antennas among the plurality of antennas if a transmission period of channel state information is elapsed; transmitting channel state information on the second number of antennas to a network device; and activating a first number of antennas among the plurality of antennas in response to transmitting the channel state information, wherein the second number of antennas may include a greater number of antennas than the first number of antennas.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
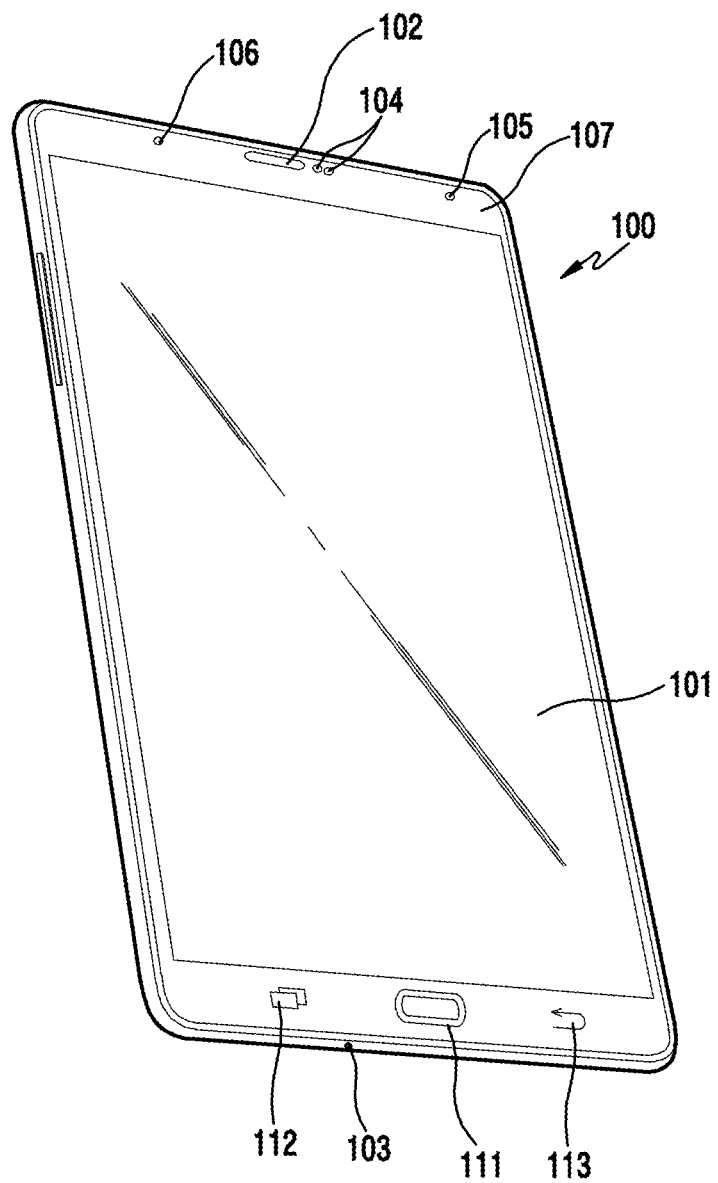
FIG. 1A illustrates an example electronic device according to various exemplary embodiments of the present disclosure.

FIGS. 1A through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various exemplary embodiments of the present document are described with reference to the accompanying drawings. It should be understood, however, that it is not intended to limit the various exemplary embodiments of the present document to the particular form disclosed, but, on the contrary, it is intended to cover all modifications, equivalents, and alternatives falling within the spirit and scope of the various exemplary embodiments of the present document. Like reference numerals denote like components throughout the drawings. A singular expression includes a plural concept unless there is a contextually distinctive difference therebetween.

In the present document, an expression "A or B", "A and/or B", or the like may include all possible combinations of items enumerated together. Although expressions such as "1 st", "2nd", "first", and "second" may be used to express corresponding constitutional elements, it is not intended to limit the corresponding constitutional elements. When a certain (e.g., 1st) constitutional element is mentioned as being "operatively or communicatively coupled with/to" or "connected to" a different (e.g., 2nd) constitutional element, the certain constitutional element is directly coupled with/to another constitutional element or can be coupled with/to the different constitutional element via another (e.g., 3rd) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device (ex. home appliance) may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1A illustrates an electronic device according to various exemplary embodiments of the present disclosure.

Referring to FIG. 1A, a display 101 may be installed on a front surface 107 of the electronic device 100.

According to one exemplary embodiment, a speaker 102 to receive a counterpart's voice may be disposed above the display 101. A microphone 103 to transmit a voice of a user of the electronic device 100 may be disposed below the display 101.

According to one exemplary embodiment, at least one sensor 104 may be provided near the speaker 102. For example, the sensor 104 may include at least one of an illumination sensor (for example, an optical sensor), a proximity sensor, an infrared sensor, and an ultrasonic sensor.

According to one exemplary embodiment, a camera 105 may be provided near the speaker 102. In addition, an indicator 106 to indicate state information on the electronic device 100 to the user may be provided near the speaker 102.

According to one exemplary embodiment, buttons 111, 112, and 113 to detect a user input may be provided below the display 101. For example, a first button 111 may be configured as a hardware button, and a second button 112 and a third button 113 may be configured as a touch pad. For example, the buttons 111, 112, and 113 to detect a user input may be configured to be part of a touch pad or touch screen.

Figure 1B:
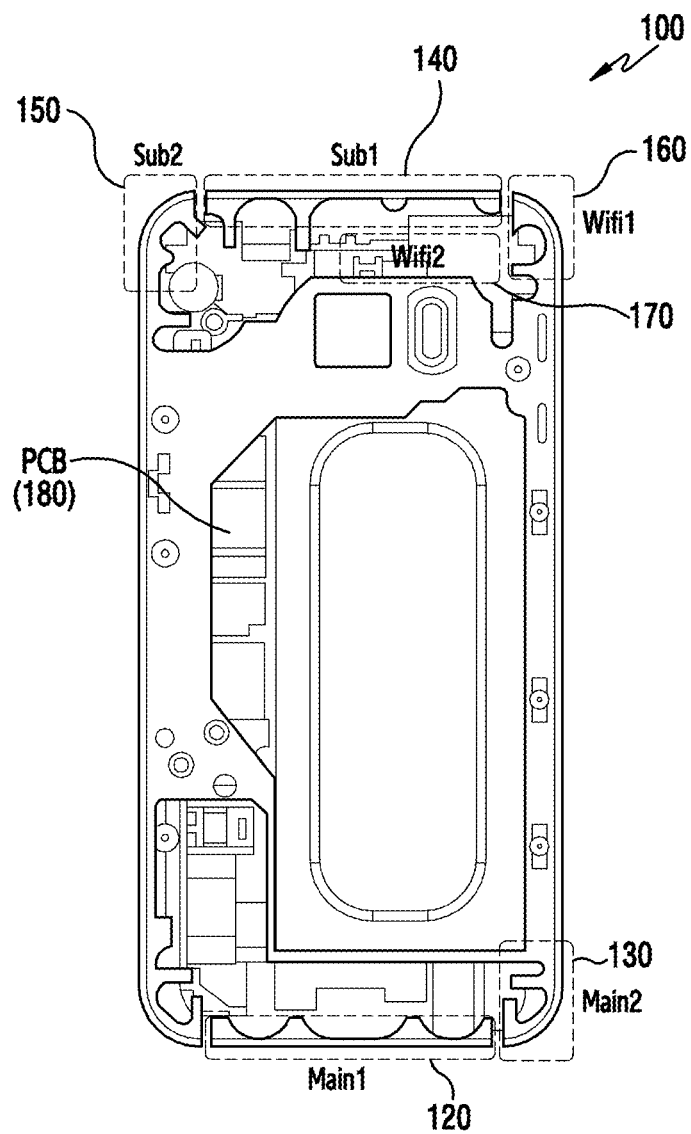
FIG. 1B illustrates an example antenna arrangement of an electronic device according to various exemplary embodiments of the present disclosure.

FIG. 1B illustrates an example antenna arrangement of an electronic device according to various exemplary embodiments of the present disclosure.

Referring to FIG. 1B, the electronic device 100 may include a plurality of antennas 120 to 170. For example, the plurality of antennas 120 to 170 may be disposed above or below a printed circuit board (PCB) 180 of the electronic device 100.

According to one exemplary embodiment, a first antenna 120 and a second antenna 130 may include a main antenna to transmit and receive a signal for a voice service or data service. For example, the first antenna 120 and the second antenna 130 may be disposed in a first area of the electronic device 100 (for example, a lower area of the electronic device). For example, the first antenna 120 may transmit and receive a signal in a middle frequency band (for example, 1700 MHz to 2100 MHz) or a low frequency band (for example, 700 MHz to 900 MHz). The second antenna 130 may transmit and receive a signal in a high frequency band (for example, 2300 MHz to 2700 MHz) or the middle frequency band. For example, the first antenna 120 and the second antenna 130 may be physically or logically separated. For example, the main antenna may refer to a reference antenna configured to transmit and receive a signal in a corresponding frequency band.

According to one exemplary embodiment, a third antenna 140 and a fourth antenna 150 may include a sub-antenna to receive a signal for a voice service or data service. For example, the third antenna 140 and the fourth antenna 150 may be disposed in a second area of the electronic device 100 (for example, an upper area of the electronic device). For example, the third antenna 140 may receive a signal in the middle frequency band or low frequency band. The fourth antenna 150 may receive a signal in the high frequency band or middle frequency band. In addition, the fourth antenna 150 may receive a satellite signal. For example, the third antenna 140 and the fourth antenna 150 may be physically or logically separated. For example, the sub-antenna may refer to a reference antenna configured to receive a signal in a corresponding frequency band.

According to one exemplary embodiment, a fifth antenna 160 and a sixth antenna 170 may transmit and receive a signal for a wireless local area network (LAN, for example, Wi-Fi). For example, the fifth antenna 160 and the sixth antenna 170 may be disposed in the second area of the electronic device 100 (for example, the upper area of the electronic device).

According to various exemplary embodiments of the present disclosure, the electronic device 100 may have the third antenna 140 and the fourth antenna 150 disposed in the first area and may have the first antenna 120 and the second antenna 130 disposed in the second area.

According to various exemplary embodiments of the present disclosure, the electronic device 100 may have the first antenna 120 and the second antenna 130 disposed on a first lateral side of the electronic device 100 and may have the third antenna 140 and the fourth antenna 150 disposed on a second lateral side.

Figure 2:
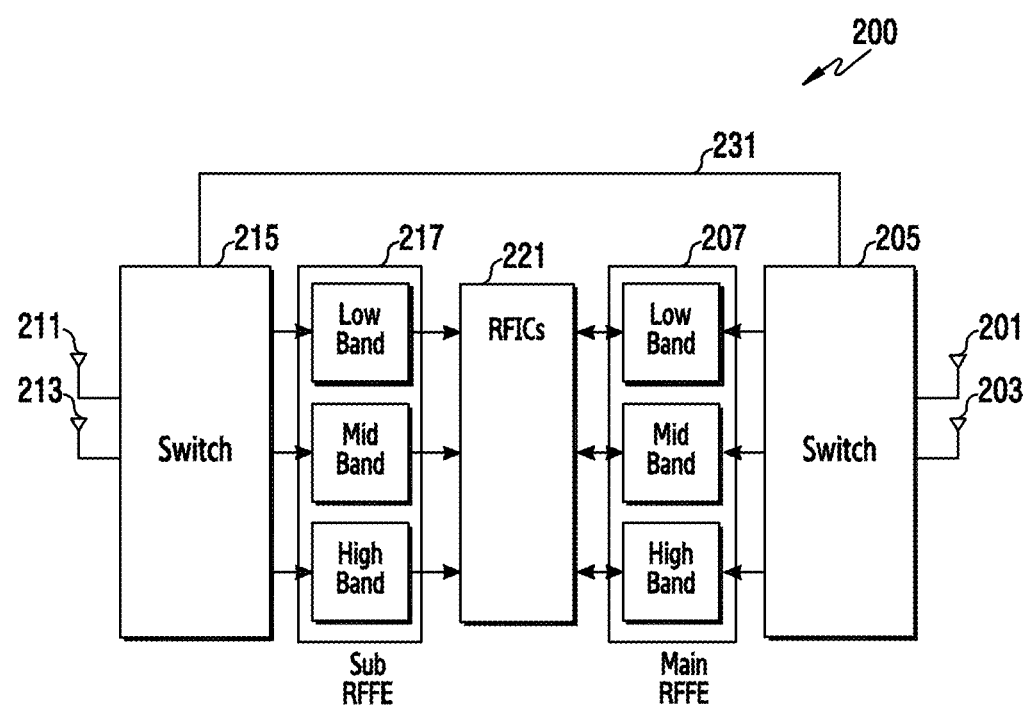
FIG. 2 illustrates an example antenna connection in an electronic device according to various exemplary embodiments of the present disclosure.

FIG. 2 illustrates an example antenna connection in an electronic device according to various exemplary embodiments of the present disclosure. In the following description, the electronic device 200 may include the whole or part of the electronic device 100 in FIG. 1A and FIG. 1B. For example, a first antenna 201 and a second antenna 203 may include the first antenna 120 and the second antenna 130 in FIG. 1B. A third antenna 211 and a fourth antenna 213 may include the third antenna 140 and the fourth antenna 150 in FIG. 1B.

Referring to FIG. 2, the electronic device 200 may include: a plurality of antennas 201, 203, 211, and 213; a plurality of switches 205 and 215; a plurality of radio frequency front end (RFFE) modules 207 and 217; and an RF integrated circuit (RFIC) module 221.

According to one exemplary embodiment, the first antenna 201 and the second antenna 203 may be disposed in a first area of the electronic device 200 (for example, the lower area of the electronic device 100), and the third antenna 211 and the fourth antenna 213 may be disposed in a second area (for example, the upper area of the electronic device 100). For example, the first antenna 201 and the second antenna 203 may be configured as a main antenna to transmit and receive a signal in a corresponding frequency band, and the third antenna 211 and the fourth antenna 213 may be configured as a sub-antenna to receive a signal in the corresponding frequency band. For example, the first antenna 201 and the second antenna 203, which are disposed in the first area, may include an antenna impedance tuner for impedance tuning.

According to one exemplary embodiment, the switches 205 and 215 may connect the plurality of antennas 201, 203, 211, and 213 and a communication circuit (for example, the RFFE modules 207 and 217, and the RFIC module 221) of the electronic device 200. For example, each switch 205 or 215 may include a switch and a diplexer.

According to one exemplary embodiment, the switch included in each switch 205 or 215 may switch a connection between the plurality of antennas 201, 203, 211, and 213 and the communication circuit (for example, the diplexer and the RFFE modules 207 and 217) of the electronic device 200 using a connection path 231. For example, the switch may be configured as a double pole double throw (DPDT) type. In this case, the switch may switch the operating modes of an antenna disposed in the first area and an antenna disposed in the second area using up/down antenna switching, thereby determining a transmitting antenna. For example, the switch is an x pole y throw (xPyT) type and may include one more pole and throw than the number of antennas disposed in a corresponding area (for example, the first area or the second area) to be connected with a switch of another switch. In this case, the switch may determine a transmitting antenna among the plurality of antennas 201, 203, 211, and 213 using up/down antenna switching, left/right antenna switching, or diagonal antenna switching. For example, the connection path 231 may be configured as a coaxial cable, a flexible PCB (FPCB) type, or a PCB internal path.

According to one exemplary embodiment, the diplexer may be used to transmit or receive signals in a plurality frequency bands through one antenna. For example, the diplexer may be used to transmit or receive signals in the low frequency band and the middle frequency band through one antenna. For example, the diplexer may be used to transmit or receive signals in the middle frequency band and the high frequency band through one antenna.

According to one exemplary embodiment, the switches 205 and 215 may connect the plurality of antennas 201, 203, 211, and 213 and an internal element of the electronic device 200 based on control by the RFIC module 221 or a processor (for example, an AP or CP) of the electronic device 200.

According to one exemplary embodiment, a main RFFE module 207 may process a signal, which is transmitted and received through one of the plurality of antennas 201, 203, 211, and 213, by the frequency band of the signal. For example, the main RFFE module 207 may include a power amplifier module (PAM), a switch, or duplexers. For example, the PAM may amplify the power of a signal to be transmitted through an antenna so that the signal is transmitted to another electronic device through a wireless environment. The switch may connect a duplexer that is suitable for a frequency band of the signal transmitted and received through the antenna and the PAM.

According to one exemplary embodiment, a sub-RFFE module 217 may process a signal, which is received through one of the plurality of antennas 201, 203, 211, and 213, by the frequency band of the signal. For example, the sub-RFFE module 217 may include a low noise amplifier (LNA), a band pass filter, or a switch. For example, the LNA may amplify a signal received through an antenna to compensate for a loss in signal strength that occurs until the received signal reaches the RFIC module 221. The switch may connect a band pass filter that is suitable for a frequency band of the signal received through the antenna and the LNA.

According to one exemplary embodiment, the RFIC module 221 may process signals transmitted and received through the antennas 201, 203, 211, and 213. For example, the RFIC module 221 may convert an RF signal, which is received through the antennas 201, 203, 211, and 213, into a baseband signal. The RFIC module 221 may convert a baseband signal, which is transmitted through the antennas 201, 203, 211, and 213, into an RF signal.

According to various exemplary embodiments of the present disclosure, when the electronic device includes main antennas and sub-antennas to respectively process signals in the high frequency band, the middle frequency band, and the low frequency band, the electronic device may not include any diplexer.

Figure 3:
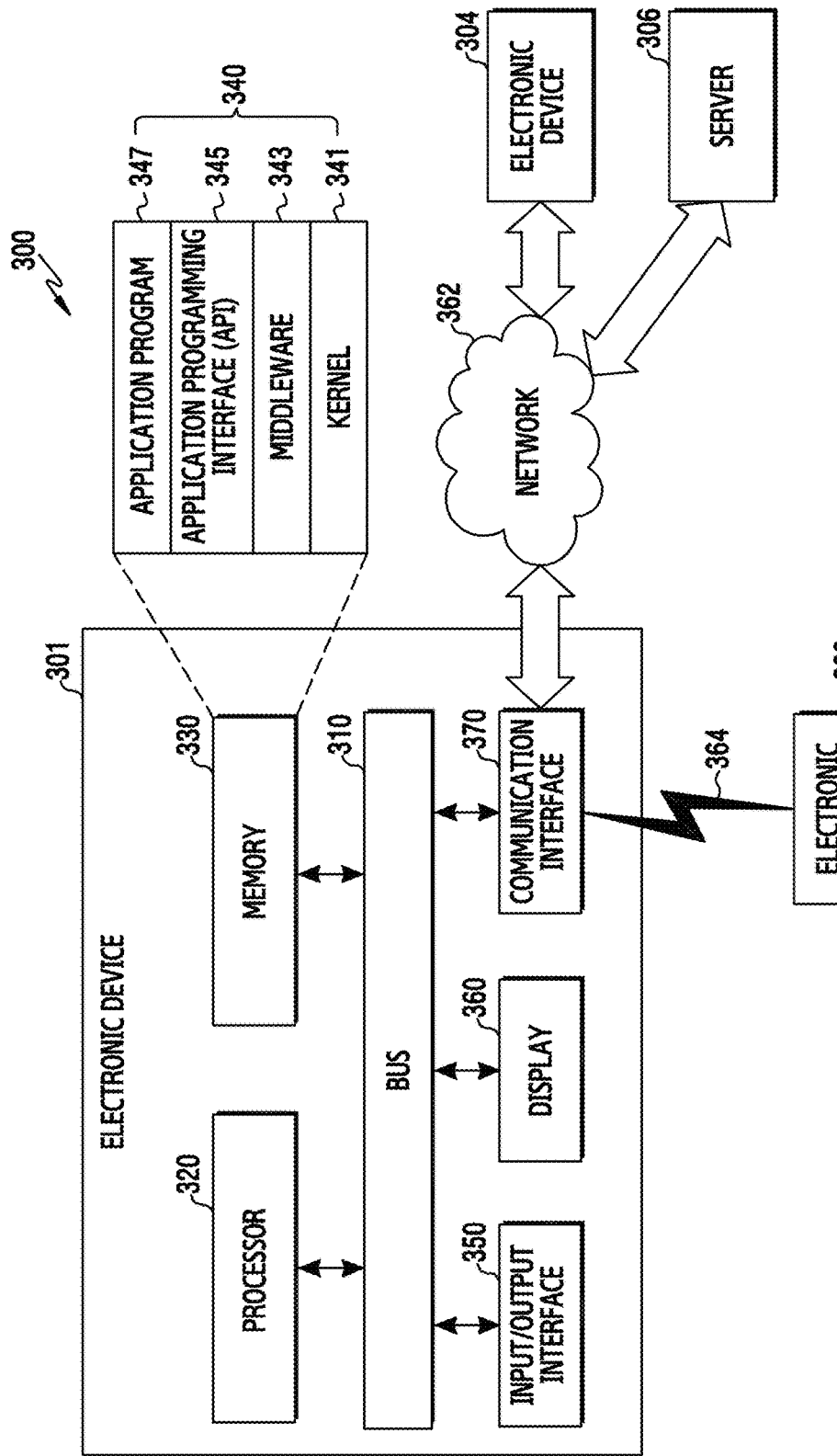
FIG. 3 illustrates an example electronic device in a network environment according to various exemplary embodiments of the present disclosure.

FIG. 3 illustrates an electronic device 301 in a network environment 300 according to various exemplary embodiments of the present disclosure.

Referring to FIG. 3, the electronic device 301 may include a bus 310, a processor 320 (e.g., including processing circuitry), a memory 330, an input/output interface 350 (e.g., including input/output circuitry), a display 360 (e.g., including display circuitry), and a communication interface 370 (e.g., including communication circuitry). In some exemplary embodiments, at least one of the components may be omitted or an additional component may be further included in the electronic device 301.

The bus 310 may include, for example, a circuit that connects the components 320 to 370 to each other and delivers communications (for example, control messages and/or data) between the components.

The processor 320 may include one or more of a central processing unit (CPU), an application processor (AP), and a communication processor (CP). The processor 320 may control, for example, at least one different component of the electronic device 301 and/or may perform an operation relating to communication or data processing. According to one exemplary embodiment, the processor 320 may be provided as an RFIC module (for example, the RFIC module 221 of FIG. 2).

According to one exemplary embodiment, when communication with an external device is connected through the communication interface 370, the processor 320 may perform control to transmit and receive a signal using at least one antenna. For example, when the electronic device 301 transmits and receives a signal in a long term evolution (LTE) communication mode, the processor 320 may perform control to use a first number of antennas (for example, two antennas) in order to obtain a diversity gain or throughput gain. For instance, the processor 320 may receive one type of data streams through two antennas to combine signals received through the respective antennas or to select one of the signals, thereby obtaining a diversity gain. For instance, the processor 320 may receive two types of data streams through two antennas, thereby obtaining a throughput gain. For example, the first number may include an antenna number set by default for the electronic device 301 to perform communication.

According to one exemplary embodiment, the processor 320 may determine a multi-antenna service through an arrangement with a network device (for example, a base station). For example, the processor 320 may arrange a multi-antenna service (for example, 4×4 MIMO) using a second number of antennas (for example, four antennas) with the network device through a radio resource control (RRC) connection procedure. For instance, the processor 320 may perform the RRC connection procedure with the network device using the first number of antennas. For example, the second number of antennas may include the first number of antennas.

According to one exemplary embodiment, when the processor 320 arranges the multi-antenna service using the second number of antennas with the network device, the processor 320 may dynamically operate the antennas that are activated in the electronic device 301 based on signal transmission and reception states. For example, when the multi-antenna service using the second number of antennas is arranged, the processor 320 may activate the first number of antennas (for example, two antennas). When the time to transmit channel state information (CSI) comes, the processor 320 may activate the second number of antennas (for example, four antennas) arranged with the network device. The processor 320 may transmit channel state information corresponding to the second number of antennas to the network device. When the channel state information is transmitted, the processor 320 may control the first number of antennas (for example, two antennas) to be activated. For example, the processor 320 may detect whether the time to transmit channel state information has come based on a transmission period of channel state information that is determined while the processor 320 arranges a multi-antenna mode with the network device. For example, when the processor 320 receives a signal requesting channel state information from the network device, the processor 320 may determine that the time to transmit channel state information has come. Specifically, the processor 320 may identify whether a request for channel state information is made by decoding a physical downlink control channel (PDCCH) used for the network device to allocate an uplink resource. For example, the channel state information may include a channel quality indicator (CQI), a pre-coding matrix indicator (PMI), and a rank indicator (RI).

According to one exemplary embodiment, when the time to transmit channel state information comes, the processor 320 may selectively activate the second number of antennas (for example, four antennas) arranged with the network device based on channel state information transmitted to the network device at the previous time. For example, the processor 320 may determine whether to activate the second number of antennas using an RI transmitted to the network device at the previous time as in Table 1.

TABLE 1

| Antenna state | RI = 1 | RI = 2 | RI = 3 | RI = 4 |
|---|---|---|---|---|
| 2RX | x | o | | |
| 4RX | x | x | o | o |

Referring to Table 1, when the RI of the first number of antennas transmitted to the network device at the time to transmit previous channel state information is 1, the processor 320 may determine that it is impossible to form an independent channel for each of the second number of antennas. Accordingly, the processor 320 may detect channel state information (for example, RI) on the first number of antennas (for example, two antennas) to transmit the channel state information to the network device, instead of activating the second number of antennas (for example, four antennas).

Referring to Table 1, when the RI of the first number of antennas transmitted to the network device at the time to transmit the previous channel state information is 2, the processor 320 may determine that it is possible to form an independent channel for each of the second number of antennas. Accordingly, the processor 320 may activate the second number of antennas (for example, four antennas) and may detect channel state information (for example, RI) on the second number of antennas to transmit the channel state information to the network device.

Referring to Table 1, when the RI of the second number of antennas transmitted to the network device at the time to transmit the previous channel state information is 1 or 2, the processor 320 may determine that it is impossible to form an independent channel for each of the second number of antennas. Accordingly, the processor 320 may detect channel state information (for example, RI) on the first number of antennas (for example, two antennas) to transmit the channel state information to the network device, instead of activating the second number of antennas (for example, four antennas).

Referring to Table 1, when the RI of the second number of antennas transmitted to the network device at the time to transmit the previous channel state information is 3 or 4, the processor 320 may determine that it is possible to form an independent channel for each of the second number of antennas. Accordingly, the processor 320 may activate the second number of antennas (for example, four antennas) and may detect channel state information (for example, RI) on the second number of antennas to transmit the channel state information to the network device.

According to one exemplary embodiment, when the time to transmit channel state information comes, the processor 320 may selectively activate the second number of antennas (for example, four antennas) arranged with the network device based on a received signal strength. For example, the processor 320 may periodically measure a received signal strength using the first number of antennas. When the time to transmit channel state information comes, the processor 320 may identify the measured received signal strength using the first number of antennas. For instance, the processor 320 may identify the last measured received signal strength. When the received signal strength exceeds a threshold strength, the processor 320 may activate the second number of antennas (for example, four antennas) to detect channel state information on the second number of antennas and may transmit the channel state information to the network device. When the received signal strength is the threshold strength or less, the processor 320 may detect channel state information on the first number of antennas (for example, two antennas) and may transmit the channel state information to the network device, instead of activating the second number of antennas (for example, four antennas). For example, the received signal strength may include reference signal received power (RSRP), signal-to-noise Ratio (SNR), reference signal received quality (RSRQ), and received signal strength indication (RSSI).

According to one exemplary embodiment, when the processor 320 receives data (traffic) from the network device, the processor 320 may selectively activate the second number of antennas (for example, four antennas) arranged with the network device based on layers (numbers) of data streams. For example, the processor 320 may be allocated a downlink resource for receiving data through a PDCCH from the network device. The PDCCH may include layer information on a data stream as in Table 2.

TABLE 2

| One codeword: Codeword 0 enabled, Codeword 1 disabled | | Two codewords: Codeword 0 enabled, Codeword 1 disabled | |
|---|---|---|---|
| Bit field mapped to index | Message | Bit field mapped to index | Message |
| 0 | 4 layers: Transmit diversity | 0 | 2 layers: TPMI = 0 |
| 1 | 1 layer: TPMI = 0 | 1 | 2 layers: TPMI = 1 |
| 2 | 1 layer: TPMI = 1 | • | • |
| • | • | • | • |
| • | • | 15 | 2 layers: TPMI = 15 |
| • | • | | |
| 16 | 1 layer: TPMI = 15 | 16 | 2 layers: Precoding according to the latest PMI report on PUSCH using the precoder(s) indicated by the reported PMI(s) |
| 17 | 1 layer: Precoding according to the latest PMI report on PUSCH using the precoder(s) indicated by the reported PMI(s) | 17 | 3 layers: TPMI = 0 |
| 18 | 2 layers: TPMI = 0 | 18 | 3 layers: TPMI = 1 |
| 19 | 2 layers: TPMI = 1 | • | • |
| • | • | • | • |
| • | • | 32 | 3 layers: TPMI = 15 |
| • | • | | |
| 33 | 2 layers: TPMI = 15 | 33 | 3 layers: Precoding according to the |

TABLE 2-continued

| One codeword: Codeword 0 enabled, Codeword 1 disabled | | Two codewords: Codeword 0 enabled, Codeword 1 disabled | |
|---|---|---|---|
| Bit field mapped to index | Message | Bit field mapped to index | Message |
| 34 | 2 layers: Precoding according to the latest PMI report on PUSCH using the precoder(s) indicated by the reported PMI(s) | 34 | 4 layers: TPMI = 0 |
| 35-63 | reserved | 35 | 4 layers: TPMI = 1 |
| | | ⋮ | ⋮ |
| | | 49 | 4 layers: TPMI = 15 |
| | | 50 | 4 layers: Precoding according to the latest PMI report on PUSCH using the precoder(s) indicated by the reported PMI(s) |
| | | 61-63 | Reserved |

Referring to Table 2, when a layer of a data stream identified in the PDCCH is 1 or 2, the processor 320 may receive data through the first number of antennas (for example, two antennas), instead of activating the second number of antennas (for example, four antennas). When the layer of the data stream identified in the PDCCH is 3 or 4, the processor 320 may activate the second number of antennas (for example, four antennas) to receive data through the second number of antennas (for example, four antennas).

The memory 330 may include a volatile and/or nonvolatile memory. The memory 330 may store, for example, a command or data related to at least one different component of the electronic device 301. According to one exemplary embodiment, the memory 330 may store software and/or a program 340. For example, the program 340 may include a kernel 341, a middleware 343, an application programming interface (API) 345, or an application program (or "application") 347. At least part of the kernel 341, the middleware 343, and the API 345 may be designated as an operating system (OS).

The kernel 341 may control or manage, for example, system resources (for example, the bus 310, the processor 320, the memory 330, or the like) used to perform an operation or function implemented in other programs (for example, the middleware 343, the API 345, or the application program 347). Further, the kernel 341 may provide an interface that allows the middleware 343, the API 345, or the application program 347 to access an individual component of the electronic device 301 to thereby control or manage the system resources.

The middleware 343 may serve as a relay so that, for example, the API 345 or the application program 347 communicates with the kernel 341 to exchange data. Further, the middleware 343 may process one or more requests for operations received from the application program 347 according to priority. For example, the middleware 343 may assign at least one application program 347 a priority for using a system resource (for example, the bus 310, the processor 320, the memory 330, or the like) of the electronic device 301 and may process one or more requests for operations. The API 345 is an interface for the application program 347 to control a function provided from the kernel 341 or the middleware 343 and may include, for example, at least one interface or function (for example, a command) for file control, window control, image processing, or text control.

The input/output interface 350 may serve as an interface that is capable of delivering a command or data, which is input from, for example, a user or different external device, to a different component(s) of the electronic device 301.

The display 360 may include, for example, a liquid crystal display (LCD), a light emitting diode (LED) display, an organic light emitting diode (OLED) display, a microelectromechanical systems (MEMS) display, or an electronic paper display. The display 360 may display, for example, various types of content (for example, a text, an image, a video, an icon, and/or a symbol) for the user. The display 360 may include a touch screen and may receive touch, gesture, proximity, or hovering inputs using, for example, an electronic pen or a user body part.

The communication interface 370 may establish communication, for example, between the electronic device 301 and an external device (for example, a first external electronic device 302, a second external electronic device 304, or a server 306). For example, the communication interface 370 may be connected to a network 362 via wireless communication or wire-based communication to communicate with the external device (for example, the second external electronic device 304 or the server 306).

The wireless communication may include cellular communication using, for example, at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). According to one exemplary embodiment, the wireless communication may include, for example, at least one of wireless fidelity (Wi-Fi), light fidelity (Li-Fi), Bluetooth, bluetooth low energy (BLE), Zigbee, near field communication (NFC), magnetic secure transmission, radio frequency (RF), and body area network (BAN). According to one exemplary embodiment, the wireless communication may include global navigation satellite system (GNSS). The GNSS may be, for example, a global positioning system (GPS), a global navigation satellite system (Glonass), a beidou navigation satellite system (Beidou), or the European global satellite-based navigation system (Galileo). In the present document, "GPS" may be interchangeably used with "GNSS" hereinafter. The wire-based communication may include, for example, at least one of universal serial bus (USB), high definition multimedia interface (HDMI), recommended standard-232 (RS-232), power line communication, and plain old telephone service (POTS). The network 362 may include a telecommunications network, for example, at least one of a computer network (for example, a local area network (LAN) or wide area network (WAN)), the Internet, and a telephone network.

The first and second external electronic devices 302 and 304 may each be a device of a type that is the same as, or different from, the electronic device 301. According to various exemplary embodiments, all or part of the operations performed in the electronic device 301 may be performed in another electronic device or a plurality of electronic devices (for example, the electronic devices 302 and 304 or the server 306). According to one exemplary embodiment, when the electronic device 301 needs to perform a function or service automatically or by request, the electronic device 301 may request another electronic device (for example, the electronic device 302 or 304, or the server 306) to perform at least some functions related to the function or service, instead of, or in addition to, autonomously performing the function or service. The other electronic device (for example, the electronic device 302 or 304, or the server 306) may perform the requested functions or additional function and may transmit the result to the electronic device 301. The electronic device 301 may provide the requested function or service by using the same received result or by additionally processing the result. To this end, for example, cloud computing, distributed computing, or client-server computing technologies may be used.

According to one exemplary embodiment, the communication interface 370 may control a connection of an antenna based on control by the processor 320. For example, as illustrated in FIG. 2, the communication interface 370 may include: the antennas 201 and 203, which are disposed in the first area (for example, the lower area) of the electronic device 301; the antennas 211 and 213, which are disposed in the second area (for example, the upper area); and the switches 205 and 215 for an antenna switch. The communication interface 370 may establish a connection between the antennas 201, 203, 211, and 213 and an internal element of the electronic device 301 (for example, the diplexers and the RFFE modules 207 and 217) using the first switch 205, the second switch 215, and the connection path 231.

Figure 4:
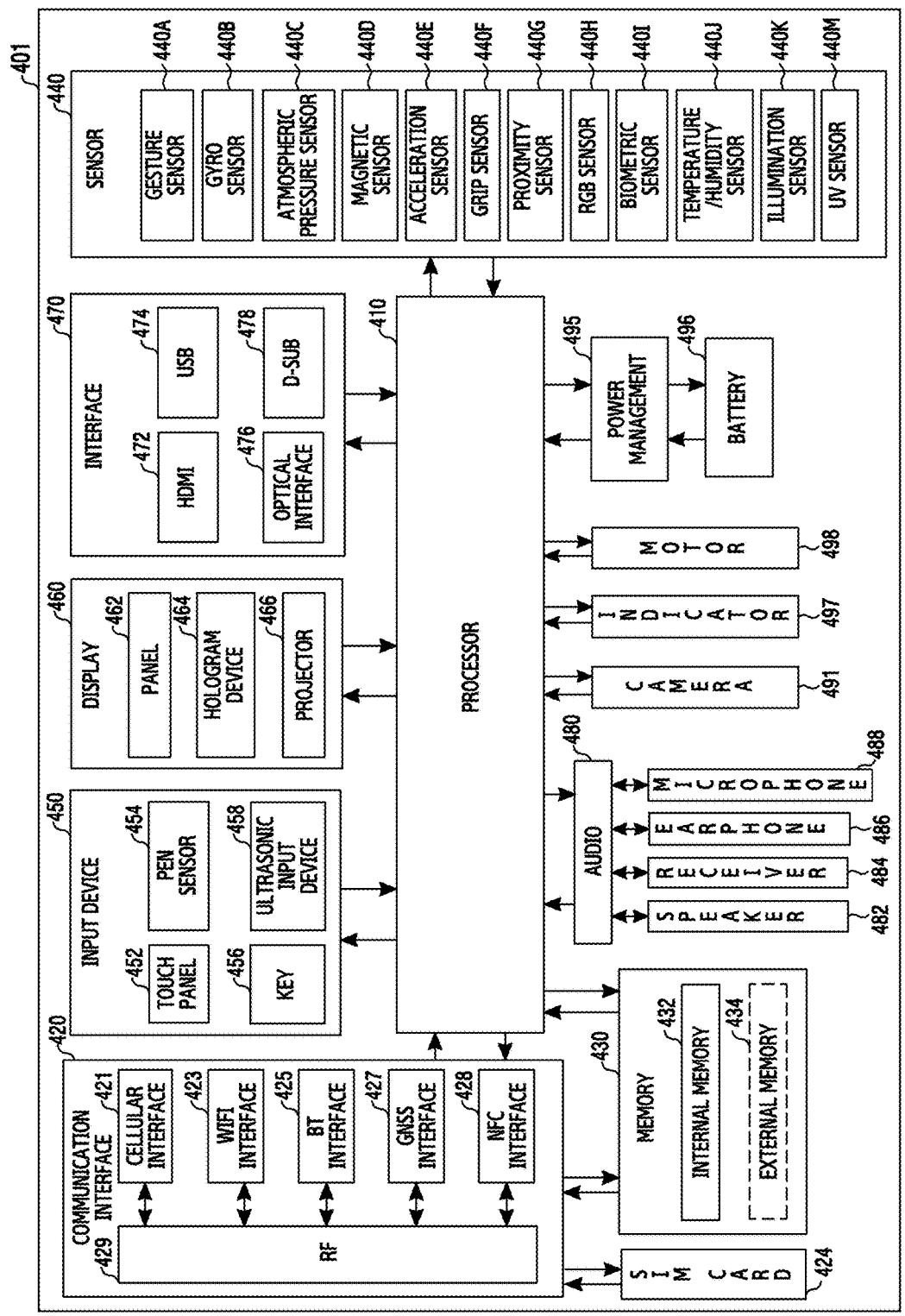
FIG. 4 illustrates an example electronic device according to various exemplary embodiments of the present disclosure.

FIG. 4 illustrates an example electronic device 401 according to various exemplary embodiments. The electronic device 401 may include, for example, the whole or part of the electronic device 301 illustrated in FIG. 3.

Referring to FIG. 4, the electronic device 401 may include one or more processors (for example, APs) 410, a communication interface 420, a subscriber identification module 424, a memory 430, a sensor 440, an input device 450, a display 460, an interface 470, an audio 480, a camera 491, a power management 495, a battery 496, an indicator 497, and a motor 498.

The processors 410 may run, for example, an OS or an application program to control a plurality of hardware or software components that are connected to the processors 410 and may perform various kinds of data processing and operations. The processors 410 may be configured, for example, as a system on chip (SoC). According to one exemplary embodiment, the processors 410 may further include a graphic processing unit (GPU) and/or an image signal processor (ISP). The processors 410 may include at least part (for example, a cellular interface 421) of the components illustrated in FIG. 4. The processors 410 may load a command or data received from at least one of the other components (for example, a nonvolatile memory) into a volatile memory to process the command or data and may store the resulting data in the nonvolatile memory.

According to one exemplary embodiment, when a multi-antenna service using a second number of antennas is arranged with a network device (for example, a base station), the processors 410 may dynamically operate the antennas that are activated in the electronic device 401 based on signal transmission and reception states.

The communication interface 420 may have a configuration that is the same as, or similar to, that of the communication interface 370 of FIG. 3. The communication interface 420 may include, for example, a cellular interface 421, a Wi-Fi interface 423, a Bluetooth interface 425, a GNSS interface 427, an NFC interface 428, and an RF 429.

The cellular interface 421 may provide, for example, a voice call, a video call, a text messaging service, or an Internet service through a communication network. According to one exemplary embodiment, the cellular interface 421 may perform identification and authentication of the electronic device 401 in a communication network using the subscriber identification module (for example, an SIM card) 424. According to one exemplary embodiment, the cellular interface 421 may perform at least part of the functions provided by the processors 410. According to one exemplary embodiment, the cellular interface 421 may include a communication processor (CP).

According to one exemplary embodiment, at least part (for example, two or more) of the cellular interface 421, the Wi-Fi interface 423, the Bluetooth interface 425, the GNSS interface 427, and the NFC interface 428 may be included in one integrated chip (IC) or IC package.

The RF 429 may transmit and receive, for example, a communication signal (for example, an RF signal). The RF 429 may include, for example, a transceiver, a power amplifier (amp) module (PAM), a frequency filter, a low noise amplifier (LNA), an antenna, or the like. According to another exemplary embodiment, at least one of the cellular interfaces 421, the Wi-Fi interface 423, the Bluetooth interface 425, the GNSS interface 427, and the NFC interface 428 may transmit and receive an RF signal through a separate RF. The subscriber identification module 424 may include, for example, a card including an SIM or an embedded SIM and may include unique identification information (for example, an Integrated Circuit Card Identifier (ICCID)) or subscriber information (for example, an International Mobile Subscriber Identity (IMSI)).

According to one exemplary embodiment, the RF 429 may control a connection and use of at least one antenna functionally connected to the electronic device 401. For example, the RF 429 may select a transmitting antenna based on the transmission performance of the electronic device 401 and an antenna characteristic of each antenna. The RF 429 may control a connection between the transmitting antenna and an internal element of the electronic device 401 through up/down antenna switching, left/right antenna switching, or diagonal antenna switching in order to transmit and receive a signal using the transmitting antenna.

The memory 430 (for example, the memory 330 of FIG. 3) may include, for example, an internal memory 432 or an external memory 434. The internal memory 432 may include, for example, at least one of a volatile memory (for example, a dynamic random-access memory (DRAM), a static RAM (SRAM), a synchronous dynamic RAM (SDRAM), or the like) and a nonvolatile memory (for example, a one-time programmable read-only memory (OTPROM), a Programmable ROM (PROM), an Erasable And Programmable ROM (EPROM), an electrically erasable programmable ROM (EEPROM), a mask ROM, a flash ROM, a flash memory, a hard drive, or a solid state drive (SSD)). The external memory 434 may include a flash drive, for example, a compact flash (CF), a secure digital (SD), a micro-SD, a mini-SD, an extreme digital (xD), a multimedia card (MMC), a memory stick, or the like. The external memory 434 may be functionally or physically connected to the electronic device 401 through various interfaces.

The sensor 440 may measure, for example, physical quantities or may detect an operation state of the electronic device 401, and may convert measured or detected information into an electrical signal. The sensor 440 may include, for example, at least one of a gesture sensor 440A, a gyro sensor 440B, a barometric pressure sensor 440C, a magnetic sensor 440D, an accelerometer 440E, a grip sensor 440F, a proximity sensor 440G, a color sensor 440H (for example, a red, green, and blue (RGB) sensor), a biometric sensor 440I, a temperature/humidity sensor 440J, an illumination sensor 440K, and an ultraviolet (UV) sensor 440M. Additionally or alternatively, the sensor 440 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor 440 may further include a control circuit to control at least one or more sensors belonging thereto. In one exemplary embodiment, the electronic device 401 may further include a processor configured, as a part of the processors 410 or separately from the processors 410, to control the sensor 440, thereby controlling the sensor 440 while the processors 410 are in a sleep state. For example, the temperature/humidity sensor 440J may include a plurality of temperature sensors disposed at different positions.

The input device 450 may include, for example, a touch panel 452, a (digital) pen sensor 454, a key 456, or an ultrasonic input device 458. The touch panel 452 may use, for example, at least one of an electrostatic type, a pressure-sensitive type, an infrared type, and an ultrasonic type. Further, the touch panel 452 may further include a control circuit. The touch panel 452 may further include a tactile layer to provide a user with a tactile response. The (digital) pen sensor 454 may, for example, be part of the touch panel or include a separate recognition sheet. The key 456 may include, for example, a physical button, an optical key, or a keypad. The ultrasonic input device 458 may detect ultrasonic waves generated in an input tool through a microphone (for example, a microphone 488) and may identify data corresponding to the detected ultrasonic waves.

The display 460 (for example, the display 360 of FIG. 3) may include a panel 462, a hologram device 464, a projector 466, and/or a control circuit to control the panel 462, the hologram device 464, and the projector 466. The panel 462 may be configured, for example, to be flexible, transparent, or wearable. The panel 462 may be formed with the touch panel 452 in one or more modules. The hologram device 464 may display a three-dimensional image in the air using the interference of light. The projector 466 may project light onto a screen to display an image. The screen may be disposed, for example, inside or outside the electronic device 401. The interface 470 may include, for example, an HDMI 472, a USB 474, an optical interface 476, or a D-subminiature (D-sub) 478. The interface 470 may be included, for example, in the communication interface 370 illustrated in FIG. 3. Additionally or alternatively, the interface 470 may include, for example, a mobile high-definition link (MHL) interface, an SD card/multi-media card (MMC) interface, or an infrared data association (IrDA) interface.

The audio 480 may convert, for example, a sound and an electrical signal reciprocally. At least some components of the audio 480 may be included, for example, in an input/output interface 350 illustrated in FIG. 3. The audio 480 may process sound information input or output, for example, through a speaker 482, a receiver 484, earphones 486, or the microphone 488.

The camera 491 is a device that takes, for example, a still image and a video. According to one exemplary embodiment, the camera 491 may include one or more image sensors (for example, a front sensor or a rear sensor), a lens, an image signal processor (ISP), or a flash (for example, an LED, a xenon lamp, or the like).

The power management 495 may manage, for example, the power of the electronic device 401. According to one exemplary embodiment, the power management 495 may include a power management integrated circuit (PMIC), a charger integrated circuit (IC), or a battery or fuel gauge. The PMIC may have wire-based and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 496. The battery 496 may include, for example, a rechargeable battery and/or a solar battery.

The indicator 497 may display a specific state of the electronic device 401 or a component thereof (for example, the processors 410), for example, a booting state, a message state, or a charging state. The motor 498 may convert an electrical signal into mechanical vibrations and may generate vibrations or a haptic effect. The electronic device 401 may include a mobile TV supporting device (for example, a GPU) that is capable of processing media data in accordance with, for example, digital multimedia broadcasting (DMB), digital video broadcasting (DVB), or mediaFlo™ standards. Each of the above-described component elements of hardware according to the present disclosure may be configured with one or more components, and the names of the corresponding component elements may vary based on the type of electronic device. According to various embodiments, the electronic device (e.g., the electronic device 401) does not include some elements or further include additional elements. Some of elements are coupled to constitute one object but the electronic device may perform the same functions as those which the corresponding elements have before being coupled to each other.

According to various exemplary embodiments of the present disclosure, an electronic device may include: a plurality of antennas; a communication circuit configured to be connected to the plurality of antennas; and at least one processor, wherein the processor may be configured to: set a multi-antenna service using a second number of antennas; activate the second number of antennas among the plurality of antennas if transmission period of channel state information is elapsed; control the communication circuit to transmit channel state information on the second number of antennas to a network device; and activate a first number of antennas among the plurality of antennas in response to transmitting the channel state information, and the second number of antennas may include a greater number of antennas than the first number of antennas.

According to various exemplary embodiments, the processor may be configured to set the multi-antenna service using the second number of antennas while the first number of antennas is activated among the plurality of antennas.

According to various exemplary embodiments, the processor may be configured to set the multi-antenna service using the second number of antennas through a radio resource control (RRC) connection procedure with the network device.

According to various exemplary embodiments, the processor may be configured to: determine whether to activate the second number of antennas based on channel state information at a previous time if the transmission period of channel state information is elapsed; and activate the second number of antennas among the plurality of antennas if the processor determines to activate the second number of antennas.

According to various exemplary embodiments, the processor may be configured to control the communication circuit to transmit channel state information on the first number of antennas to the network device if the processor determines not to activate the second number of antennas.

According to various exemplary embodiments, the processor may be configured to: identify a received signal strength if the transmission period of channel state information is elapsed; determine whether to activate the second number of antennas based on the received signal strength; and activate the second number of antennas among the plurality of antennas if the processor determines to activate the second number of antennas.

According to various exemplary embodiments, the processor may be configured to control the communication circuit to transmit channel state information on the first number of antennas to the network device if the processor determines not to activate the second number of antennas.

According to various exemplary embodiments, the processor may be configured to: identify a layer of a data stream when a downlink resource is allocated; determine whether to activate the second number of antennas based on the layer of the data stream; activate the second number of antennas among the plurality of antennas if the processor determines to activate the second number of antennas; and receive data using the second number of antennas.

According to various exemplary embodiments, the processor may be configured to receive data using the first number of antennas if the processor determines not to activate the second number of antennas.

According to various exemplary embodiments, the processor is configured to identify the layer of the data stream in a PDCCH.

According to various exemplary embodiments, the channel state information may include at least one of CQI, PMI, and RI.

Figure 5:
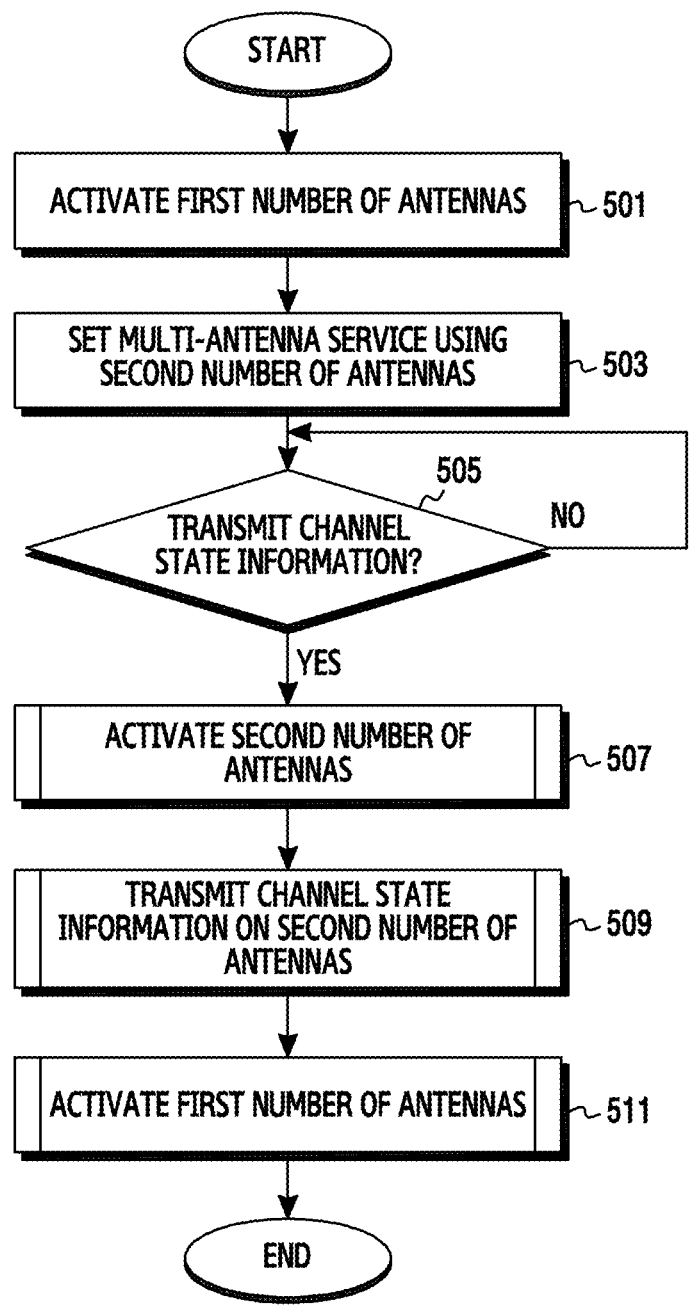
FIG. 5 illustrates a flowchart of an electronic device for an antenna control method according to various exemplary embodiments of the present disclosure.
Figure 6:
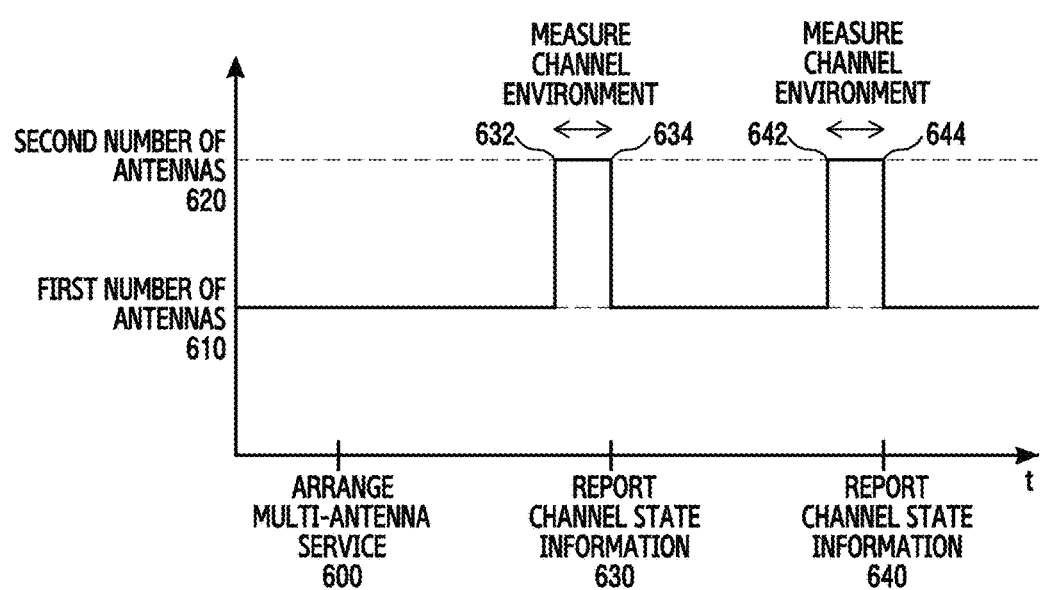
FIG. 6 illustrates an example activated state of an antenna corresponding to a transmission of channel state information in an electronic device according to various exemplary embodiments of the present disclosure.

FIG. 5 illustrates a flowchart of an electronic device for antenna control method according to various exemplary embodiments of the present disclosure. FIG. 6 illustrates an example activated state of an antenna corresponding to the transmission of channel state information in an electronic device according to various exemplary embodiments of the present disclosure. In the following description, the electronic device may include the whole or part of the electronic device 301 in FIG. 3.

Referring to FIG. 5, in operation 501, the electronic device may activate a first number of antennas (for example, two antennas). For example, when the electronic device operates in a standby mode as in FIG. 6, the processor 320 may maintain two predefined antennas in the activated state among a second number 620 of antennas (for example, four antennas) included in the electronic device 301.

In operation 503, the electronic device may set a multi-antenna service using the second number of antennas through an arrangement with a network device. For example, when the electronic device includes the second number of antennas (for example, four antennas), the processor 320 may set a communication connection with the network device and the multi-antenna service (for example, 4×4 MIMO) using the second number of antennas through an RRC connection procedure (600).

When the multi-antenna service using the second number of antennas is set with the network device, the electronic device may identify whether the time to transmit channel state information has come in operation 505. For example, the processor 320 may identify a transmission period of channel state information through an RRC connection reconfiguration signal in the RRC connection procedure. Accordingly, the processor 320 may identify whether the transmission period of channel state information is elapsed. For example, the network device may request uplink data and channel state information from the electronic device 301 while allocating an uplink resource to the electronic device 301. When the processor 320 receives a signal requesting channel state information from the network device, the processor 320 may determine that the time to transmit channel state information has come.

When the time to transmit channel state information has not come, the electronic device may identify again whether the time to transmit channel state information has come in operation 505.

When the time to transmit channel state information has come, the electronic device may activate the second number of antennas arranged with the network device in operation 507. For example, when the time to transmit channel state information has come, with the first number 610 of antennas (for example, two antennas) activated, the processor 320 may activate two additional antennas, thus activating the second number 620 of antennas (for example, four antennas) (632 and 642). For example, the processor 320 may activate a communication circuit (for example, diplexers and RFFE modules) connected to two antennas to be additionally activated among the deactivated antennas.

In operation 509, the electronic device may transmit channel state information on the second number of antennas arranged with the network device to the network device. For example, the processor 320 may measure channel state information corresponding to the four antennas arranged with the network device to transmit the channel state information to the network device (630 and 640).

When the channel state information on the second number of antennas is transmitted, the electronic device may switch the number of activated antennas of the electronic device to the first number in operation 511. For example, when the channel state information is transmitted, the processor 320 may perform control to activate only two antennas (the first number 610 of antennas) among the second number 620 of antennas (for example, four antennas) (634 and 644). That is, the processor 320 may control to switch the other two antennas into a deactivated state. For example, the processor 320 may deactivate a communication circuit (for example, diplexers and RFFE modules) connected to the other two antennas.

Figure 7:
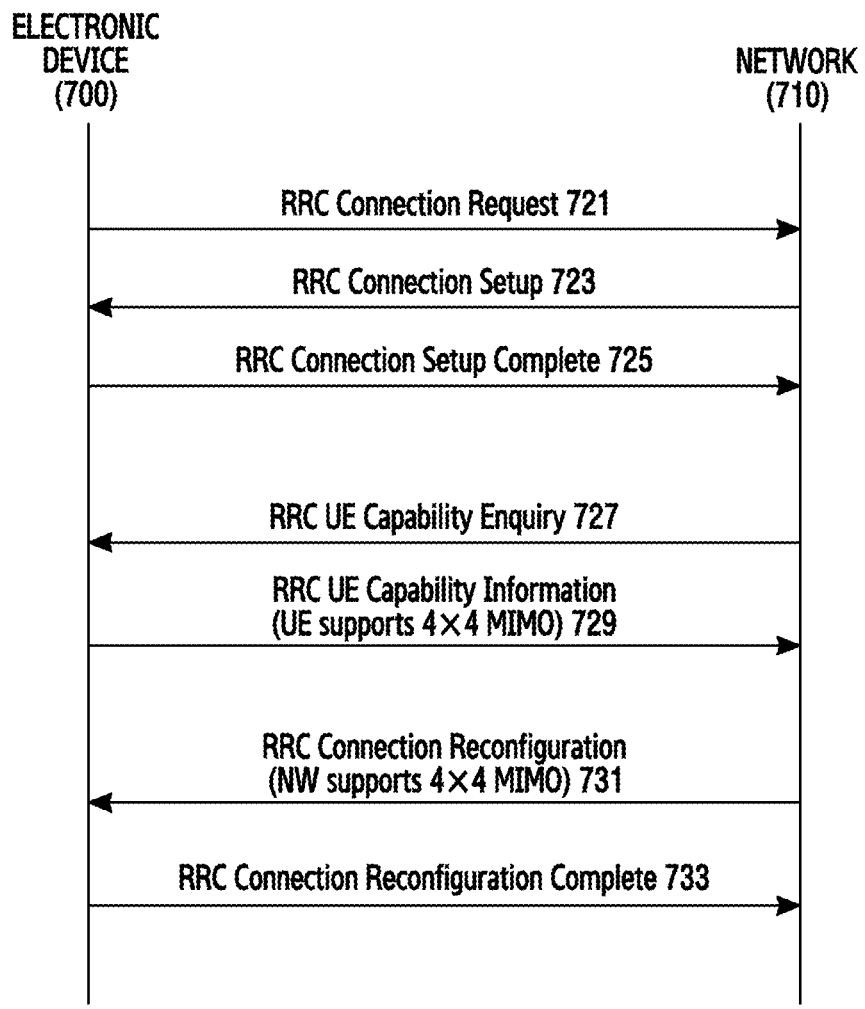
FIG. 7 illustrates a signal flowchart for an arrangement of a multi-antenna service according to various exemplary embodiments of the present disclosure.

FIG. 7 illustrates a signal flowchart for an arrangement of a multi-antenna service according to various exemplary embodiments of the present disclosure. The following description illustrates an operation of arranging a multi-antenna service between the network device and the electronic device as in operation 503 of FIG. 5. In the following description, the electronic device may include the whole or part of the electronic device 301 in FIG. 3.

Referring to FIG. 7, the electronic device 700 may transmit an RRC connection request signal to a network device 710 (for example, evolved Node B (eNB) or radio network controller (RNC)) based on a request from an upper layer (for example, an application) of the electronic device 700 (721). For example, the electronic device 700 may request the network device 710 to set up a control channel through the RRC connection request signal.

The network device 710 may transmit an RRC connection setup signal to the electronic device 700 in response to the RRC connection request signal (723). For example, the RRC connection setup signal may include control channel information.

After transmitting the RRC connection request signal, the electronic device 700 may continuously receive a downlink signal for a reference time in order to receive the RRC connection setup signal. When the electronic device 700 receives RRC connection setup information within the reference time, the electronic device 700 may transmit an RRC connection setup complete signal to the network device 710 (725).

When the RRC connection setup complete signal is received, the network device 710 may determine that an RRC connection with the electronic device 700 has been completed. The network device 710 may transmit an RRC UE capability enquiry signal to the electronic device 700 in order to set up a communication mode of the electronic device 700 (727).

The electronic device 700 may transmit an RRC UE capability information signal including supportable service information on the electronic device 700 to the network device 710 in response to the RRC UE capability enquiry signal (729). For example, the electronic device 700 may transmit, to the network device 710, support information on a multi-antenna service (for example, 4×4 MIMO) using a second number of antennas (for example, four antennas) through the RRC UE capability information signal.

The network device 710 may determine a communication mode with the electronic device 700 based on the supportable service information on the electronic device 700 that is identified through the RRC UE capability information signal. For example, the network device 710 may determine to use the multi-antenna service (for example, 4×4 MIMO) using the second number of antennas (for example, four antennas) based on the supportable service information on the electronic device 700.

The network device 710 may transmit communication mode information (for example, 4×4 MIMO) determined by the network device 710 to the electronic device 700 through an RRC connection reconfiguration signal (731).

The electronic device 700 may identify the communication mode determined by the network device 710 through the RRC connection reconfiguration signal. When the electronic device 700 uses the communication mode determined by the network device 710, the electronic device 700 may transmit an RRC connection reconfiguration complete signal to the network device 710 in response to the RRC connection reconfiguration signal (733).

When the network device 710 receives the RRC connection reconfiguration complete signal, the network device 710 determines that an arrangement of the communication mode with the electronic device 700 has been completed and may perform communication with the electronic device 700 in the communication mode. For example, when the RRC connection reconfiguration complete signal is received, the network device 710 may determine that the use of the multi-antenna service (for example, 4×4 MIMO) using the second number of antennas (for example, four antennas) is arranged with the electronic device 700.

Figure 8:
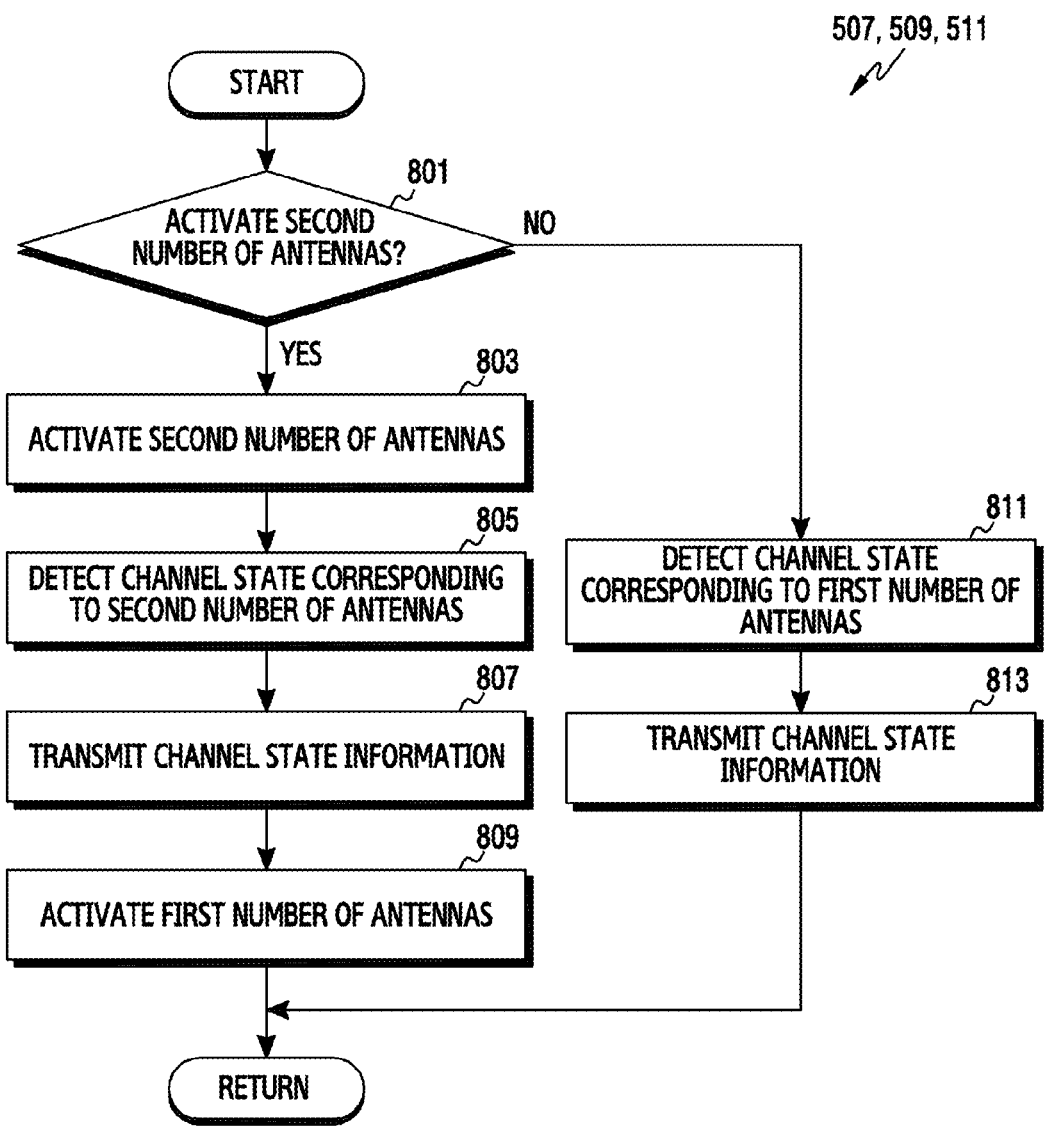
FIG. 8 illustrates a flowchart of an electronic device for dynamic transmission of channel state information according to various exemplary embodiments of the present disclosure.

FIG. 8 illustrates a flowchart of an electronic device for dynamic transmission of channel state information according to various exemplary embodiments of the present disclosure. The following description illustrates an operation of transmitting channel state information as in operation 507 to operation 511 of FIG. 5. In the following description, the electronic device may include the whole or part of the electronic device 301 in FIG. 3.

Referring to FIG. 8, when the time to transmit channel state information comes (for example, operation 505 in FIG. 5), the electronic device may determine whether to activate a second number of antennas in operation 801. For example, the processor 320 may determine whether to activate the second number of antennas (for example, four antennas) arranged with the network device based on channel state information transmitted to the network device at the previous time. Specifically, the processor 320 may identify the number of channels that are possible to be independently formed using the second number of antennas based on the channel state information at the previous time. When the number of channels that are possible to be independently formed using the second number of antennas is a reference number (for example, three) or greater, the processor 320 may determine to activate the second number of antennas. For example, the processor 320 may determine whether to activate the second number of antennas arranged with the network device based on a received signal strength corresponding to the time to transmit the channel state information. For instance, the processor 320 may determine whether to activate the second number of antennas using a received signal strength measured at a time proximate to the time to transmit the channel state information among received signal strengths periodically measured using the first number of antennas.

When the electronic device determines to activate the second number of antennas, the electronic device may activate the second number of antennas in operation 803. For example, when the 4×4 MIMO is arranged with the network device, the processor 320 may activate two additional antennas, with two antennas activated, thereby activating four antennas.

In operation 805, the electronic device may detect channel state information corresponding to the second number of antennas. For example, when the 4×4 MIMO is arranged with the network device, the processor 320 may measure channel state information corresponding to the four antennas. The channel state information may include, for example, at least one of CQI, PMI, and RI.

In operation 807, the electronic device may transmit the channel state information corresponding to the second number of antennas to the network device. For example, when the 4×4 MIMO is arranged with the network device, the processor 320 may activate the four antennas to transmit the channel state information corresponding to the four antennas to the network device.

In operation 809, the electronic device may change the number of activated antennas in the electronic device to the first number. For example, after transmitting the channel state information, the processor 320 may deactivate two antennas and may maintain the other two antennas in the activated state. For example, the processor 320 may deactivate the two additional antennas activated in operation 803. For instance, the processor 320 may compare the channel states of the four antennas and may deactivate two antennas with a relatively poor channel state.

When the electronic device determines not to activate the second number of antennas, the electronic device may detect channel state information corresponding to the first number of antennas in operation 811. For example, when the 4×4 MIMO is arranged with the network device but the processor 320 determines that it is unnecessary to operate the four antennas, the processor 320 may measure the channel state information corresponding to the two antennas.

The electronic device may transmit the channel state information corresponding to the first number of antennas to the network device in operation 813.

Figure 9:
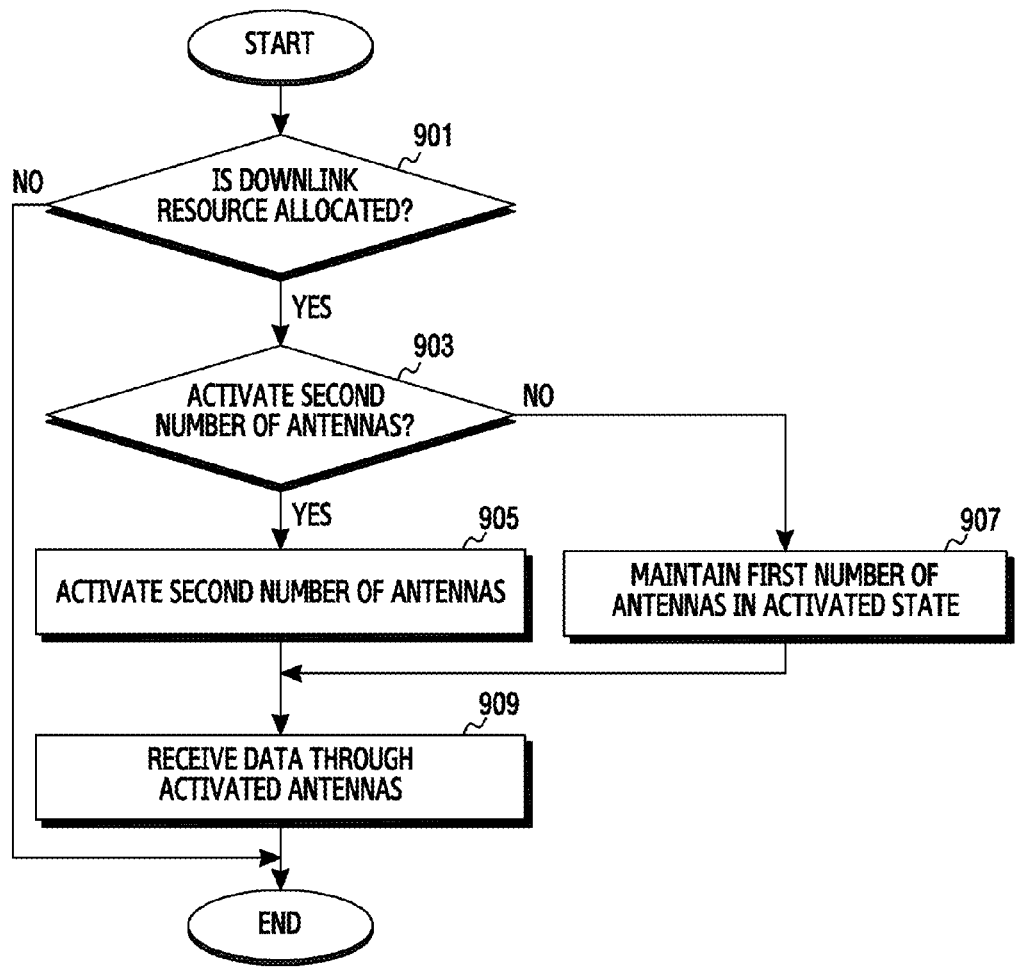
FIG. 9 illustrates a flowchart of an electronic device for controlling an antenna according to various exemplary embodiments of the present disclosure.

FIG. 9 illustrates a flowchart of an electronic device for controlling an antenna according to various exemplary embodiments of the present disclosure. In the following description, the electronic device may include the whole or part of the electronic device 301 in FIG. 3.

Referring to FIG. 9, the electronic device may identify whether a downlink resource is allocated from a network device in operation 901. For example, the processor 320 may identify whether a downlink resource is allocated from the network device through a PDCCH periodically received from the network device.

When a downlink resource is allocated from the network device, the electronic device may determine whether to activate a second number of antennas based on a layer of a data stream in operation 903. For example, the processor 320 may identify the layer information on the data stream included in the PDCCH as in Table 2. When the layer of the data stream is 3 or 4, the processor 320 may determine to activate the second number of antennas arranged with the network device. When the layer of the data stream is 1 or 2, the processor 320 may determine not to activate the second number of antennas arranged with the network device.

When the electronic device determines to activate the second number of antennas, the electronic device may activate the second number of antennas (for example, four antennas) in operation 905. For example, the processor 320 may maintain two antennas in the activated state to provide an LTE service. When the processor 320 determines to activate the second number of antennas with the 4×4 MIMO arranged with the network device, the processor 320 may activate two additional antennas other than the activated two antennas in order to use the four antennas arranged with the network device.

When the electronic device determines not to activate the second number of antennas, the electronic device may maintain the first number of antennas in the activated state in operation 907. For example, when an LTE service is provided, the processor 320 may maintain the two antennas in the activated state in order to obtain a diversity gain or throughput gain using a multi-antenna service.

The electronic device may receive data (traffic) from the network device using the activated antennas in operation 909. For example, when the layer of the data stream identified through the PDCCH is 3 or 4, the processor 320 may receive data from the network device using the four antennas arranged with the network device. When the layer of the data stream is 1 or 2, the processor 320 may receive data from the network device using the activated two antennas.

According to various exemplary embodiments of the present disclosure, the electronic device may perform an operation of transmitting/receiving data to/from the network device and an operation of transmitting channel state information to the network device in parallel. Accordingly, when the time to transmit channel state information comes while the electronic device is receiving data using the second number of antennas arranged with the network device, the electronic device may omit an operation of activating the second number of antennas illustrated in operation 507 of FIG. 5 and an operation of changing the number of activated antennas to the first number illustrated in operation 511.

According to various exemplary embodiments of the present disclosure, an operating method of an electronic device may include: setting a multi-antenna service using a second number of antennas among a plurality of antennas functionally connected to the electronic device; activating the second number of antennas among the plurality of antennas if a transmission period of channel state information is elapsed; transmitting channel state information on the second number of antennas to a network device; and activating a first number of antennas among the plurality of antennas in response to transmitting the channel state information, wherein the second number of antennas may include a greater number of antennas than the first number of antennas.

According to various exemplary embodiments, the setting of the multi-antenna service may include arranging, with the network device, setting of the multi-antenna service using the second number of antennas while the first number of antennas is activated among the plurality of antennas.

According to various exemplary embodiments, the setting of the multi-antenna service may include setting the multi-antenna service using the second number of antennas through an RRC connection procedure with the network device.

According to various exemplary embodiments, the activating of the second number of antennas may include: determining whether to activate the second number of antennas based on channel state information at a previous time if the transmission period of channel state information is elapsed; and activating the second number of antennas among the plurality of antennas if determining to activate the second number of antennas.

According to various exemplary embodiments, the method may further include transmitting channel state information on the first number of antennas to the network device if determining not to activate the second number of antennas.

According to various exemplary embodiments, the activating of the second number of antennas may include: identifying a received signal strength if the transmission period of channel state information is elapsed; determining whether to activate the second number of antennas based on the received signal strength; and activating the second number of antennas among the plurality of antennas if determining to activate the second number of antennas.

According to various exemplary embodiments, the method may further include transmitting channel state information on the first number of antennas to the network device if determining not to activate the second number of antennas.

According to various exemplary embodiments, the switching to activate the first number of antennas may include: selecting the first number of antennas from the second number of antennas; and deactivating antennas that are not selected as the first number of antennas among the second number of antennas.

According to various exemplary embodiments, the method may further include: identifying a layer of a data stream if a downlink resource is allocated; determining whether to activate the second number of antennas based on the layer (or number) of the data stream; activating the second number of antennas among the plurality of antennas in response to determination that to activate the second number of antennas; and receiving data using the second number of antennas.

According to various exemplary embodiments, the method may further include receiving data using the first number of antennas if determining not to activate the second number of antennas.

According to various exemplary embodiments, the channel state information may include at least one of CQI, PMI, and RI.

An electronic device and an operating method thereof according to various exemplary embodiments may arrange a multi-antenna service with a network and may dynamically manage the number of activated antennas of the electronic device to correspond to signal transmission and reception states, thereby reducing the power consumption of the electronic device caused by the multi-antenna service and obtaining a gain due to the multi-antenna service.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 320), may cause the one or more processors to execute the function corresponding to the instruction. The computer-readable storage medium may be, for example, the memory 330.

The computer readable recoding medium may include a hard disk, a floppy disk, magnetic media (for example, a magnetic tape), optical media (for example, a compact disc read only memory (CD-ROM) and a digital versatile disc (DVD)), magneto-optical media (for example, a floptical disk), a hardware device (for example, a read only memory (ROM), a random access memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a plurality of antennas;
a communication circuit connected to the plurality of antennas; and
at least one processor configured to:
set a multi-antenna service using a second number of antennas among the plurality of antennas:
in response to determining that a transmission period of channel state information is elapsed,
control the communication circuit to transmit, to a network device, the channel state information on the second number of antennas; and
activate a first number of antennas among the plurality of antennas in response to transmitting the channel state information, wherein remaining antennas except the first number of antennas among the plurality of antennas are deactivated, and
wherein the second number of antennas comprise a greater number of antennas than the first number of antennas.

2. The electronic device of claim 1, wherein the at least one processor is further configured to set the multi-antenna service using the second number of antennas while the first number of antennas are activated among the plurality of antennas.

3. The electronic device of claim 1, wherein the at least one processor is further configured to set the multi-antenna service using the second number of antennas through a radio resource control (RRC) connection procedure with the network device.

4. The electronic device of claim 1, wherein the at least one processor is further configured to:
determine whether to activate the second number of antennas based on the channel state information in response to determining that the transmission period of channel state information is elapsed; and
activate the second number of antennas among the plurality of antennas in response to determining to activate the second number of antennas.

5. The electronic device of claim 4, wherein the at least one processor is further configured to control the communication circuit to transmit, to the network device, the channel state information on the first number of antennas in response to determining not to activate the second number of antennas.

6. The electronic device of claim 1, wherein the at least one processor is further configured to:
identify a received signal strength in response to determining that the transmission period of channel state information is elapsed;
determine whether to activate the second number of antennas based on the received signal strength; and activate the second number of antennas among the plurality of antennas in response to determining to activate the second number of antennas.

7. The electronic device of claim 6, wherein the at least one processor is further configured to control the communication circuit to transmit, to the network device, the channel state information on the first number of antennas in response to determining not to activate the second number of antennas.

8. The electronic device of claim 1, wherein the at least one processor is further configured to:
identify a layer of a data stream when a downlink resource is allocated;
determine whether to activate the second number of antennas based on the layer of the data stream;
activate the second number of antennas among the plurality of antennas in response to determining to activate the second number of antennas; and
receive data using the second number of antennas.

9. The electronic device of claim 8, wherein the at least one processor is further configured to receive data using the first number of antennas in response to determining not to activate the second number of antennas.

10. The electronic device of claim 8, wherein the at least one processor is further configured to identify the layer of the data stream in a physical downlink control channel (PDCCH).

11. An operating method of an electronic device, the method comprising:
setting a multi-antenna service using a second number of antennas among a plurality of antennas functionally connected to the electronic device;
in response to determining that a transmission period of channel state information is elapsed,
transmitting, to a network device, the channel state information on the second number of antennas; and
activating a first number of antennas among the plurality of antennas in response to transmitting the channel state information, wherein the second number of antennas comprise a greater number of antennas than the first number of antennas.

12. The method of claim 11, wherein setting the multi-antenna service comprises, arranging with the network device, setting the multi-antenna service using the second number of antennas while the first number of antennas are activated among the plurality of antennas.

13. The method of claim 11, wherein setting the multi-antenna service comprises setting the multi-antenna service using the second number of antennas through a radio resource control (RRC) connection procedure with the network device.

14. The method of claim 11, wherein transmitting the channel state information comprises:
determining whether to activate the second number of antennas based on the channel state information in response to determining that the transmission period of channel state information is elapsed;
activating the second number of antennas among the plurality of antennas in response to determining to activate the second number of antennas; and
transmitting, to the network device, the channel state information on the second number of antennas.

15. The method of claim 14, further comprising transmitting, to the network device, the channel state information on the first number of antennas to the network device in response to determining not to activate the second number of antennas.

16. The method of claim 11, wherein transmitting the channel state information comprises:
identifying a received signal strength in response to determining that the transmission period of channel state information is elapsed;
determining whether to activate the second number of antennas based on the received signal strength;
activating the second number of antennas among the plurality of antennas in response to determining to activate the second number of antennas; and
transmitting, to the network device, the channel state information on the second number of antennas.

17. The method of claim 16, further comprising transmitting, to the network device, the channel state information on the first number of antennas in response to determining not to activate the second number of antennas.

18. The method of claim 11, wherein activating the first number of antennas comprises:
selecting the first number of antennas from the second number of antennas; and
deactivating antennas that are not selected as the first number of antennas among the second number of antennas.

19. The method of claim 11, further comprising:
identifying a layer of a data stream if a downlink resource is allocated;
determining whether to activate the second number of antennas based on the layer of the data stream;
activating the second number of antennas among the plurality of antennas in response to determining to activate the second number of antennas; and
receiving data using the second number of antennas.

20. The method of claim 19, further comprising receiving data using the first number of antennas in response to determining not to activate the second number of antennas.

* * * * *